United States Patent [19]
Takano

[11] Patent Number: 5,652,623
[45] Date of Patent: Jul. 29, 1997

[54] VIDEO CODING METHOD WHICH ALTERNATES THE NUMBER OF FRAMES IN A GROUP OF PICTURES

[75] Inventor: Shunsuke Takano, Kanagawa, Japan

[73] Assignee: Sony Corporation, Tokyo, Japan

[21] Appl. No.: 628,506

[22] Filed: Apr. 5, 1996

[30] Foreign Application Priority Data

Apr. 8, 1995 [JP] Japan .................................. 7-107970

[51] Int. Cl.⁶ .................................................. H04N 11/02
[52] U.S. Cl. ................................................... 348/384
[58] Field of Search .............................. 348/415, 409, 348/401, 400, 416, 402, 390, 384; 382/236, 238, 232; H04N 7/137

[56] References Cited

U.S. PATENT DOCUMENTS 5,506,686 4/1996 Auyeung et al. ...................... 348/409
5,559,557 9/1996 Kato ........................................ 348/405

*Primary Examiner*—Amelia Au
*Assistant Examiner*—Bryan S. Tung
*Attorney, Agent, or Firm*—William S. Frommer; Alvin Sinderbrand

[57] ABSTRACT

An apparatus and a method of the present invention for coding input picture data are so contrived as to adaptively change the number (N) of unitary frames, which constitute a group of pictures (GOP), in conformity with the frame rate of the input picture data, thereby forming picture data of a predetermined unitary time in a predetermined unit of GOPs.

2 Claims, 9 Drawing Sheets

VIDEO CODING METHOD WHICH ALTERNATES THE NUMBER OF FRAMES IN A GROUP OF PICTURES

BACKGROUND OF THE INVENTION

The present invention relates to a coding apparatus and method applicable to, for example, a case of coding input picture data by dividing one sequence of moving pictures into groups each of which is composed of a plurality of frames.

As one of the techniques adopted for coding picture data with compression, there is known the MPEG (Moving Picture Experts Group) system. According to this MPEG system, one sequence of moving pictures is coded through division into GOPs (Groups Of Pictures) each composed of a plurality of frames. Each GOP consists of at least one intra-frame coded picture (I-picture) inserted in the GOP, an inter-frame coded picture (P-picture) predicted from a temporally preceding frame already coded, and an inter-frame coded picture (B-picture) predicted from two temporally preceding and following frames.

Normally in the MPEG, the number of frames constituting one GOP is not prescribed in particular. However, generally in the television standard of 525/60 (scanning lines/field frequency, 525 lines/60 Hz, NTSC) system, the number N of frames constituting one GOP is set to 15, and the appearance period M of an I-picture or a P-picture is set to 3. More specifically, two B-pictures are inserted between an I-picture and a P-picture, and a total of 15 pictures are grouped to form a GOP. Consequently, random access to picture data is rendered possible since the picture data including an I-picture are thus processed in a unit of a GOP. Meanwhile in the other television standard of 625/50 (scanning lines/field frequency, 625 lines/50 Hz, PAL or SECAM) system, the number of frames constituting one GOP is set to 12.

In case the input picture data before being coded with picture compression are formed in a unit of seconds, convenience is attainable if the data coded with picture compression can be managed in a unit of seconds as well. For example, in a commercial film where one sequence of moving pictures is divided in a unit of seconds such as 15 or 30 seconds, the compression-coded picture data also need to be temporally managed in a unit of seconds. In the 525/60 system for example where picture data are transmitted at a rate of 30 frames per second, pictures corresponding to one second can be formed exactly in two GOPs each composed of 15 frames, as illustrated in FIG. 1. Consequently it becomes possible to perform picture editing or random access with facility by processing the picture data in a unit of GOPs.

Meanwhile in the 625/50 system, 25 frames are required to form pictures of one second, since picture data are transmitted at a rate of 25 frames per second. However, as illustrated in FIG. 2, merely 24 frames are obtained in two GOPs, so that it is impossible to form required pictures corresponding exactly to one second in a unit of GOPs. In such a case, it has been customary heretofore to adopt a technique of constituting each GOP by 12 frames and balancing the figures temporally in the last GOP where the number of frames is less than 12. In adopting this technique, however, there exists a problem that considerable differences are prone to occur in the quantities of generated data among GOPs.

Adequate measures for solving the above problems may be achieved by setting the frame number per GOP to, e.g., 25 in the 625/50 system. But if the frame number per GOP is excessively increased, it causes another problem that the unit of random access is rendered immoderately larger. Furthermore, taking into account the quantity of generated data in a unit of GOPs, there arises a problem that the result attained is quite different from the 525/60 system.

OBJECT AND SUMMARY OF THE INVENTION

It is therefore an object of the present invention to provide a coding apparatus and method capable of temporally managing, in a predetermined unit time, picture data coded in a unit of GOPs each composed of a plurality of frames.

For the purpose of achieving the above object, the coding apparatus of the present invention is so contrived as to adaptively change the number of unitary frames, which constitute a GOP, in conformity with the frame rate of input picture data, thereby forming pictures of a predetermined unitary time in a predetermined unit of GOPs.

The features and advantages of the present invention will become apparent from the following description which will be given with reference to the illustrative accompanying drawings.

DETAILED DESCRIPTION OF THE PREFERRED EMBODIMENTS

Hereinafter a preferred embodiment of the present invention will be described in detail with reference to the accompanying drawings.

Figure 1:
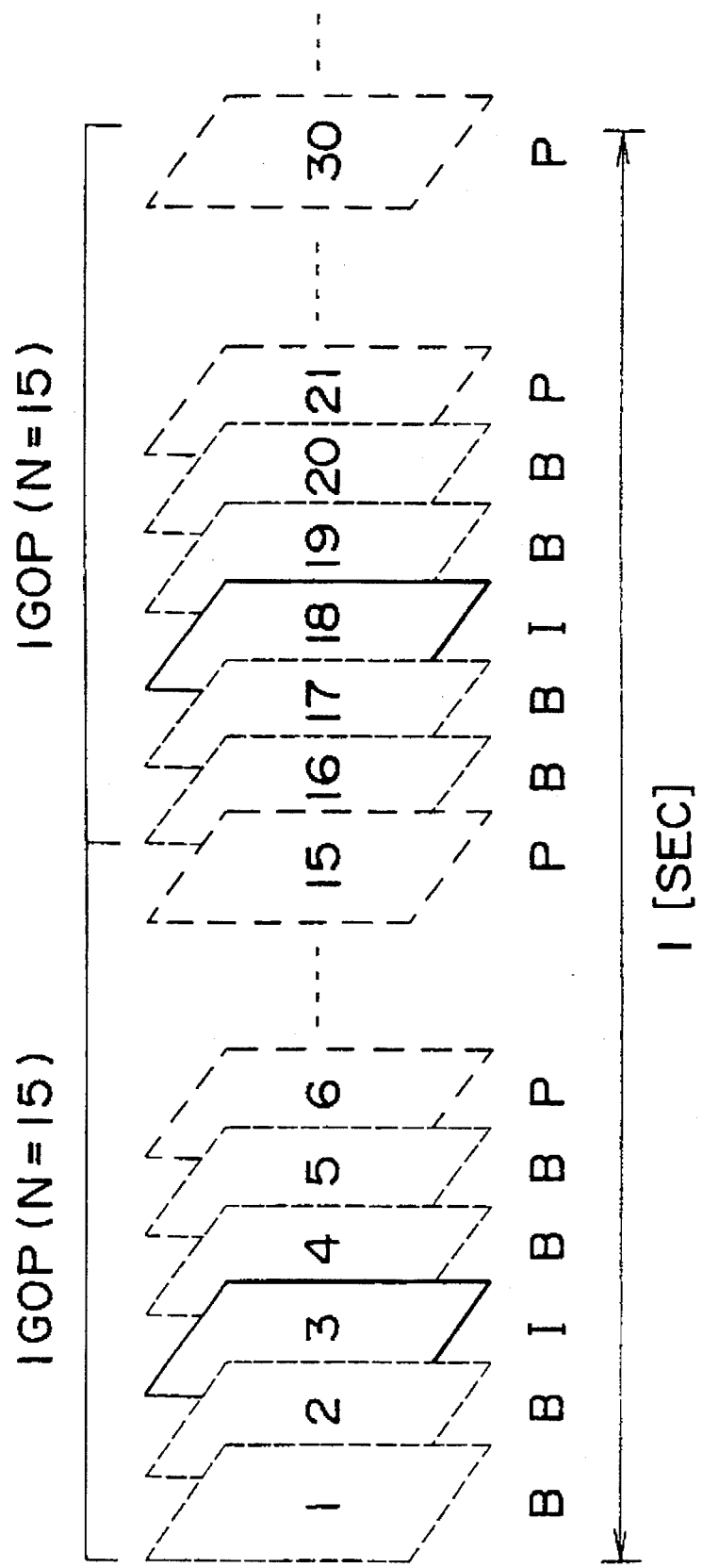
FIG. 1 is a schematic diagram for explaining how pictures of one second are formed of 15 frames in each GOP according to the prior art.
Figure 2:
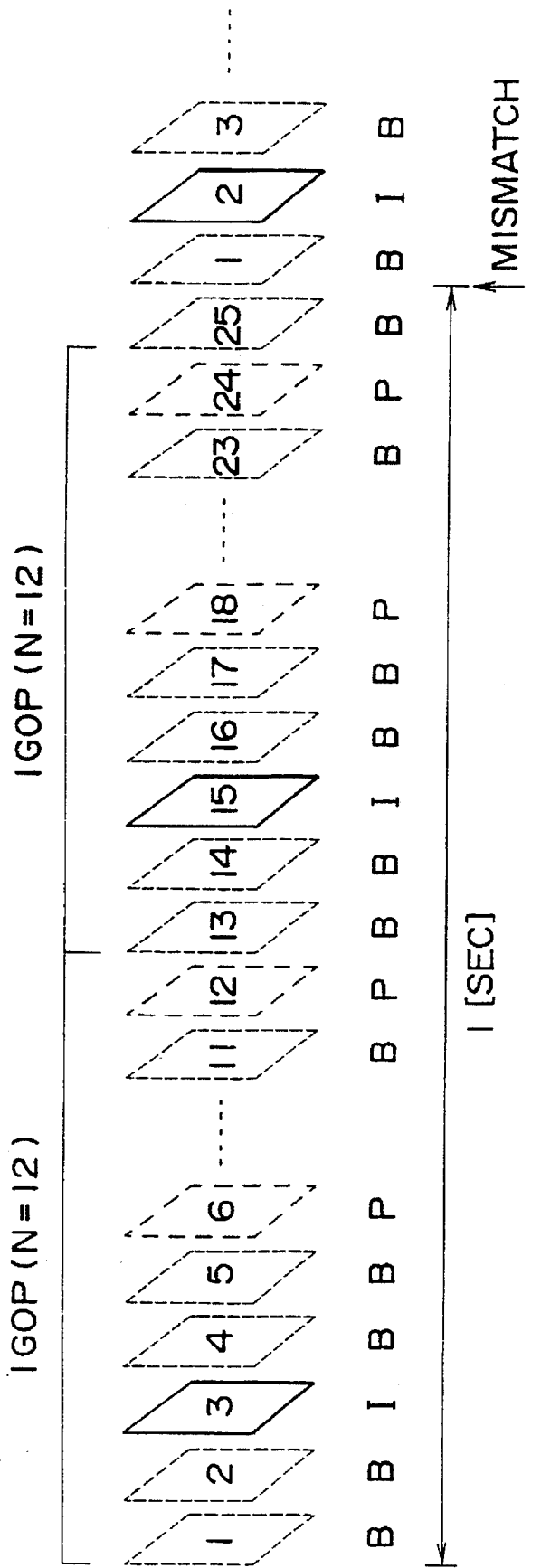
FIG. 2 is a schematic diagram for explaining how pictures of one second are formed of 12 frames in each GOP according to the prior art.
Figure 3:
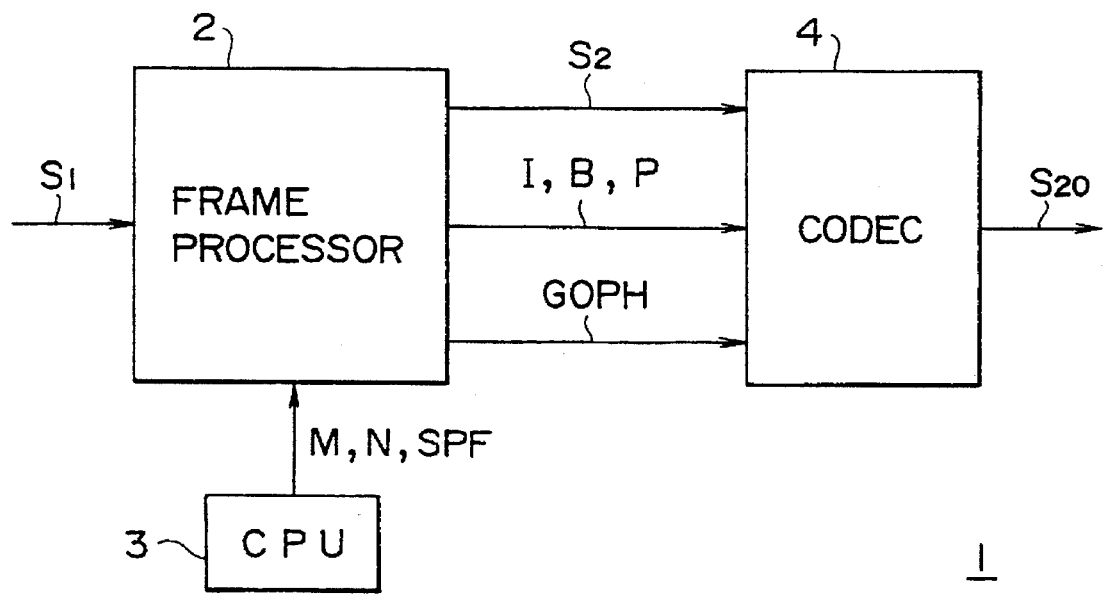
FIG. 3 is a block diagram showing an embodiment of the coding apparatus of the present invention.

In FIG. 3, reference numeral 1 denotes a coding apparatus as a whole. When picture data are inputted to a frame processor 2, the picture data are rearranged under control of a CPU 3, and then a header and a picture type of a GOP are supplied in this order to a codec 4 in the following stage. Subsequently the codec 4 processes the picture data through DCT (discrete cosine transform), quantization and variable-length coding, and then outputs processed picture data $S_{20}$ therefrom.

Figure 4:
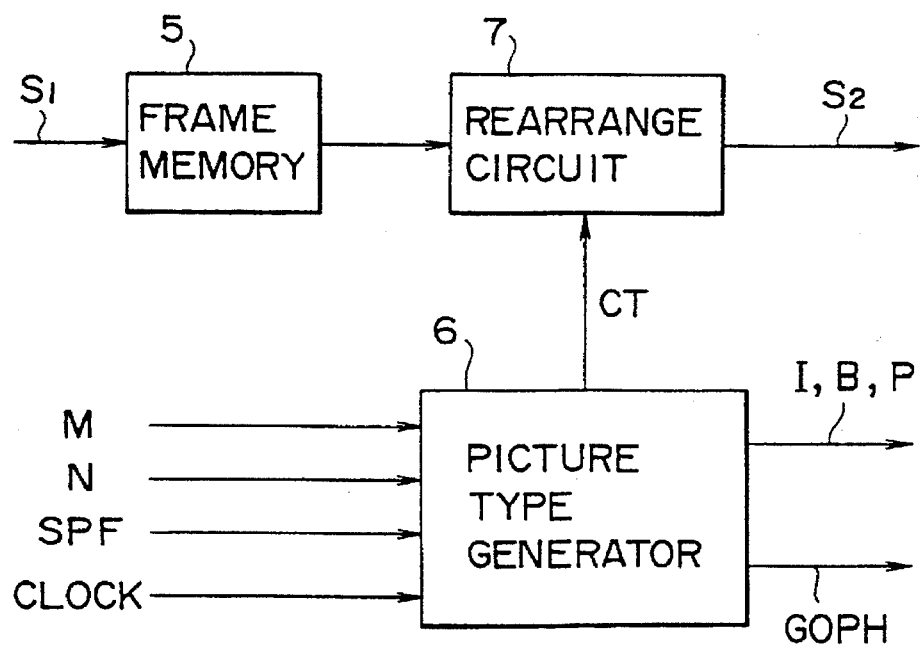
FIG. 4 is a block diagram showing an exemplary constitution of a frame processor employed in the coding apparatus of FIG. 1.

As shown in FIG. 4, the picture data inputted to the frame processor 2 are once stored in a frame memory 5. Meanwhile to a picture type generator 6, there are supplied, together with clock pulses synchronized with the frames, an appearance period M of an I- or P-picture, the number N of frames in a GOP, and a flag SPF which instructs an operation of changing the number of frames in a GOP. The picture type generator 6 generates a control signal CT for controlling instruction of rearrangement of the picture data in accordance with predictive coding on the basis of such appearance period M, frame number N and flag SPF, and then sends the control signal CT to a rearrange circuit 7.

The rearrange circuit 7 reads out the picture data in a unit of frame from the frame memory 5 in response to the control signal CT and, after rearranging the frames in accordance with the MPEG coding system, outputs the rearranged data successively. At this time, the picture type generator 6 generates a GOP header GOPH and a picture type on the basis of a picture type generation algorithm. Consequently the rearranged picture data $S_2$ are supplied, next to the header GOPH, to the following-stage codec 4 in synchronism with the picture type.

Figure 5:
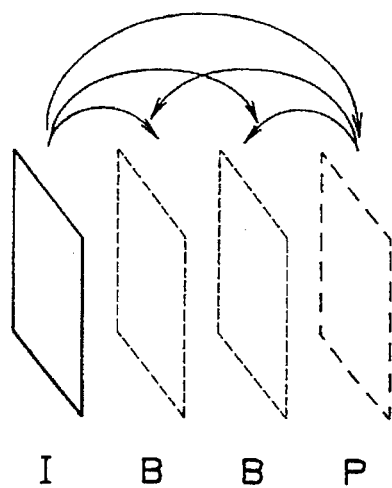
FIG. 5 schematically illustrates three picture types used in the MPEG system.

In the MPEG system, one sequence of moving pictures is divided into GOPs each composed of a plurality of frames. As illustrated in FIG. 5, each GOP is composed of at least one intra-frame coded picture (I-picture) inserted therein, an inter-frame coded picture (P-picture) predicted from a temporally preceding frame already coded, and an inter-frame coded picture (B-picture) predicted from two temporally preceding and following frames.

Figure 7:
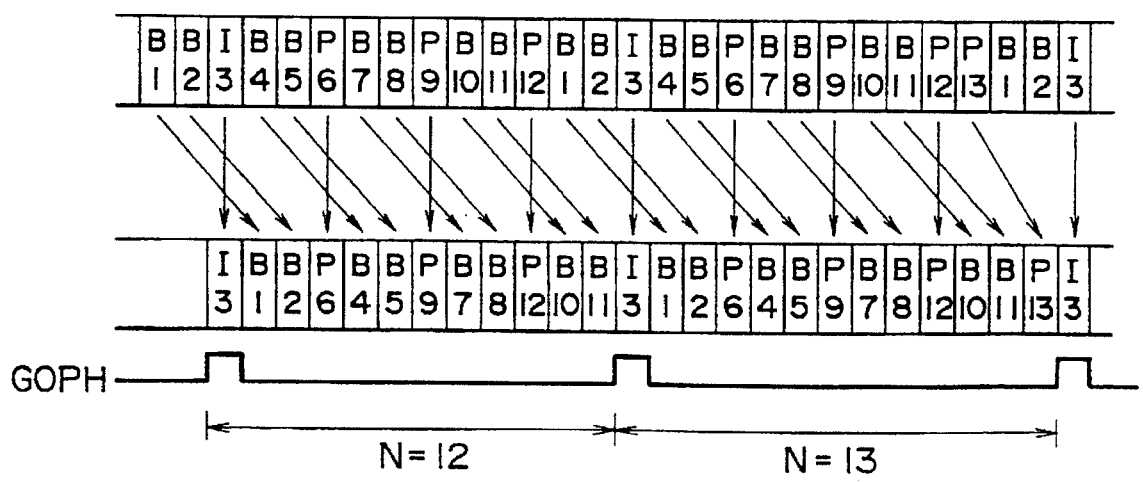
FIG. 7 is a schematic diagram for explaining how picture types are rearranged when the number of frames in one GOP is changed alternately to 12 and 13 in the coding apparatus of FIG. 1.
Figure 6:
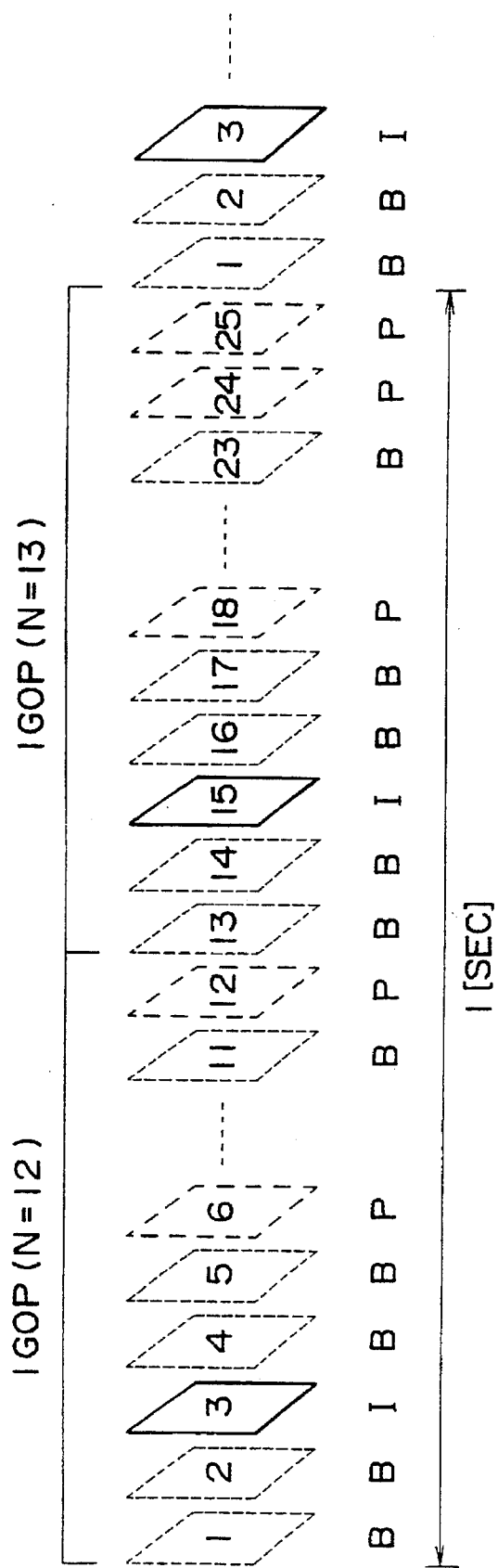
FIG. 6 is a schematic diagram for explaining how the number of frames in one GOP is changed alternately to 12 and 13 in the coding apparatus of FIG. 1.

When the picture data are those based on the 625/50 system where a data transmission rate is 25 frames per second, it follows that 25 frames are required for obtaining picture data of one second. Then the frame processor 2 changes the frame number N of GOPs to 12 and 13 alternately and dynamically in response to a control signal CT during the frame reading mode. Consequently, as illustrated in FIG. 6, picture data of one second can be obtained exactly in two GOPs where picture data of 25 frames are formed. The individual picture types of the frames are thus rearranged by the rearrange circuit 7 as shown in FIG. 7 and then are supplied to the codec 4. In case the frame number N is 13, since the last frame in the GOP needs to be a P-picture as prescribed in the standard, a P-picture is added as the last frame.

Figure 8:
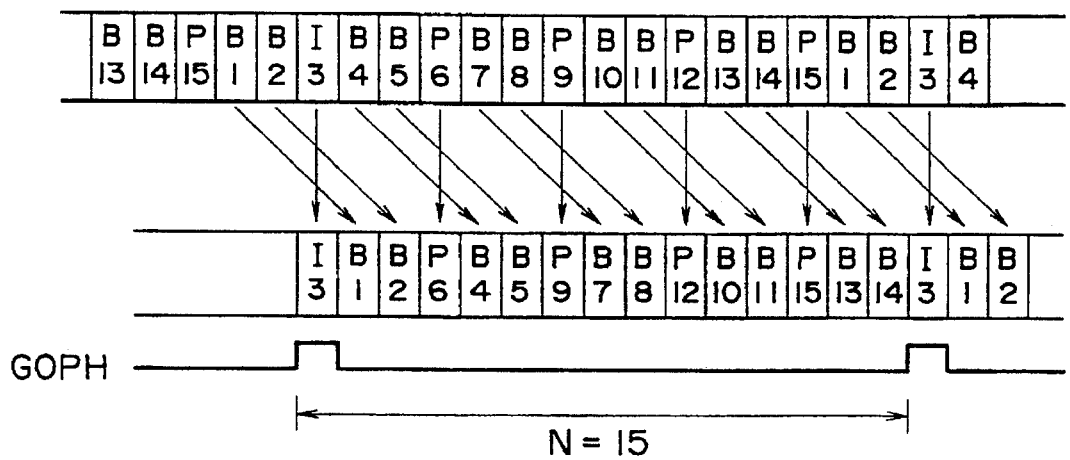
FIG. 8 is a schematic diagram for explaining how picture types are rearranged when one GOP is composed of 15 frames.

Meanwhile, when the picture data $S_1$ are those based on the 525/60 system where a data transmission rate is 30 frames per second, the frame number N is set to 15 as in the conventional case, and the frames in each GOP are rearranged as shown in FIG. 8 and then are sent to the codec 4, whereby pictures corresponding to one second are formed of two GOPs in the 525/60 system. Thus, it becomes possible to access the coded picture data of GOPs in a unit of second.

Figure 9:
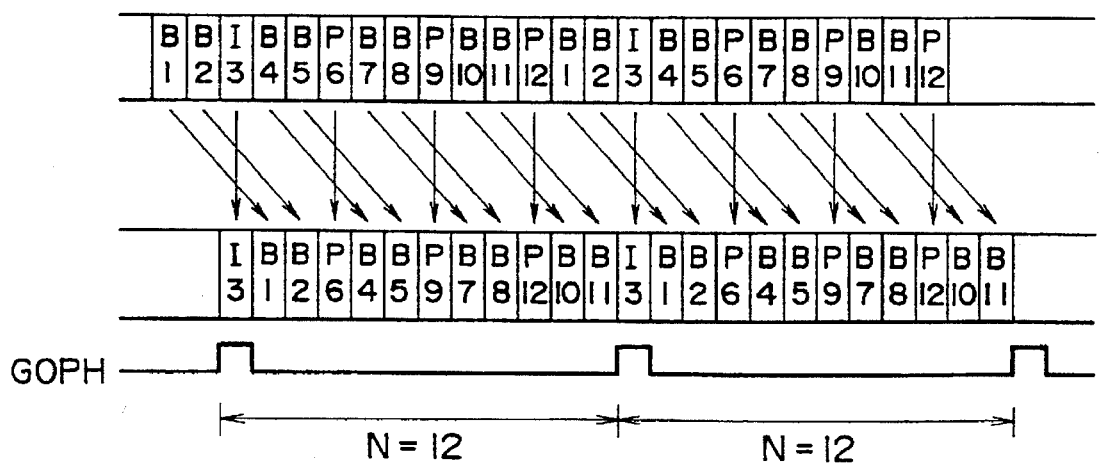
FIG. 9 is a schematic diagram for explaining how picture types are rearranged when one GOP is composed of 12 frames.

Further, when the frame number N is set to 12 as in the conventional case in the 625/50 system, the individual picture types of the frames are rearranged as shown in FIG. 9 and then are sent to the codec 4, where the frame number N, the appearance period M and the flag SPF are set in advance by a program or the like in conformity with the transmission rate of the input picture data $S_1$.

Figure 10:
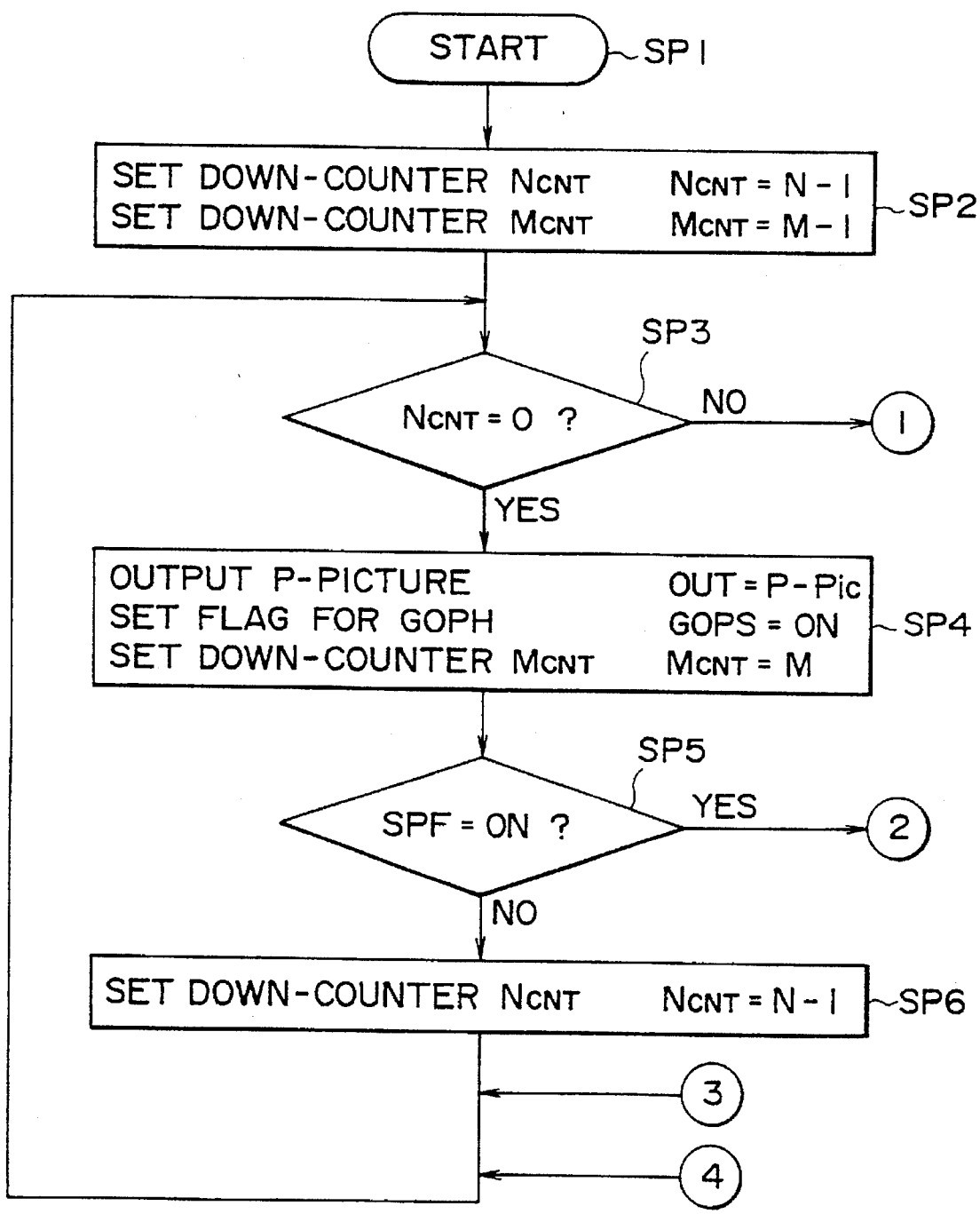
FIG. 10 is a flow chart for explaining a procedure to set picture types in the coding apparatus of FIG. 1.
Figure 11:
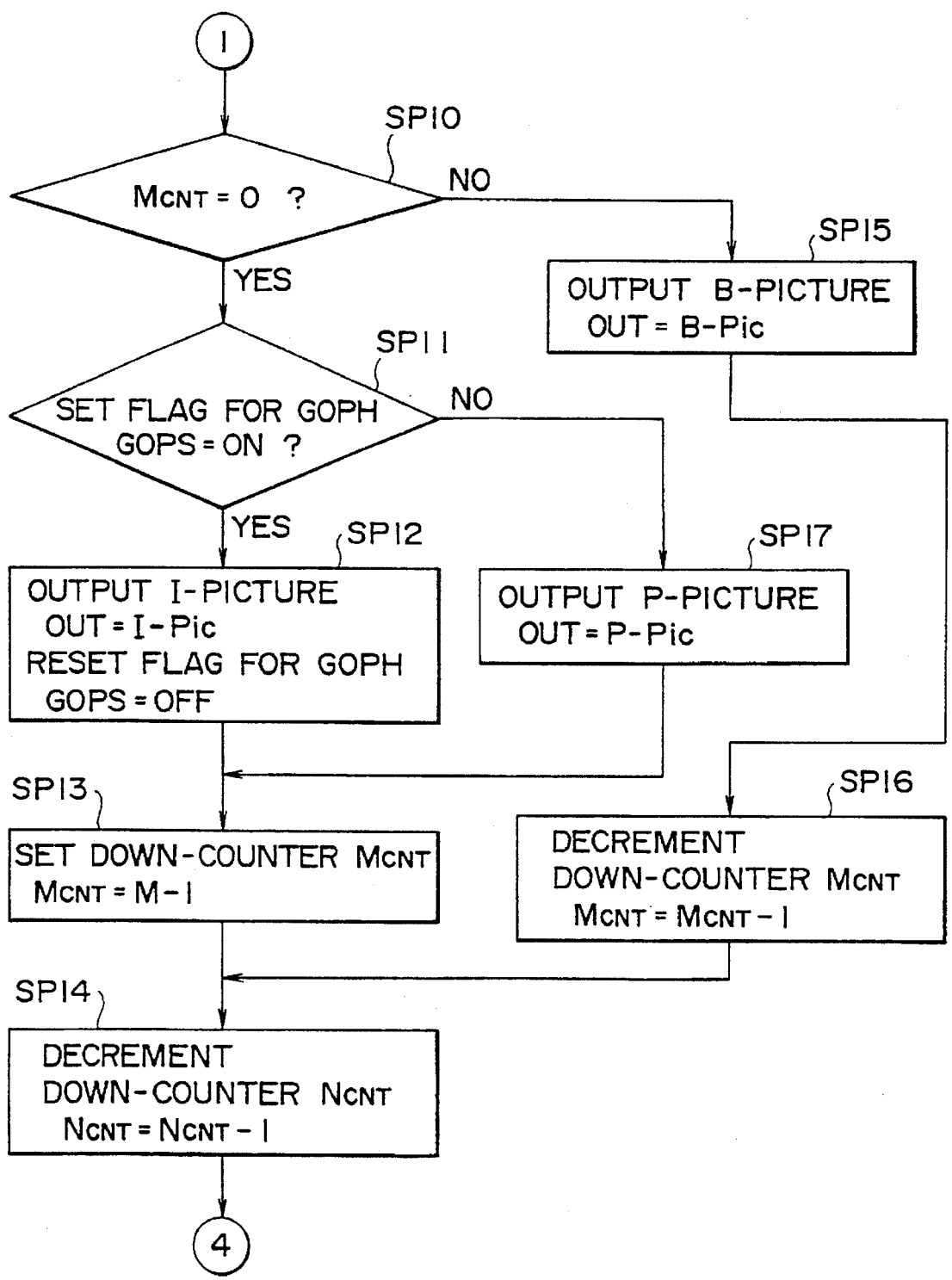
FIG. 11 is another flow chart for explaining the procedure to set picture types in the coding apparatus of FIG. 1.
Figure 12:
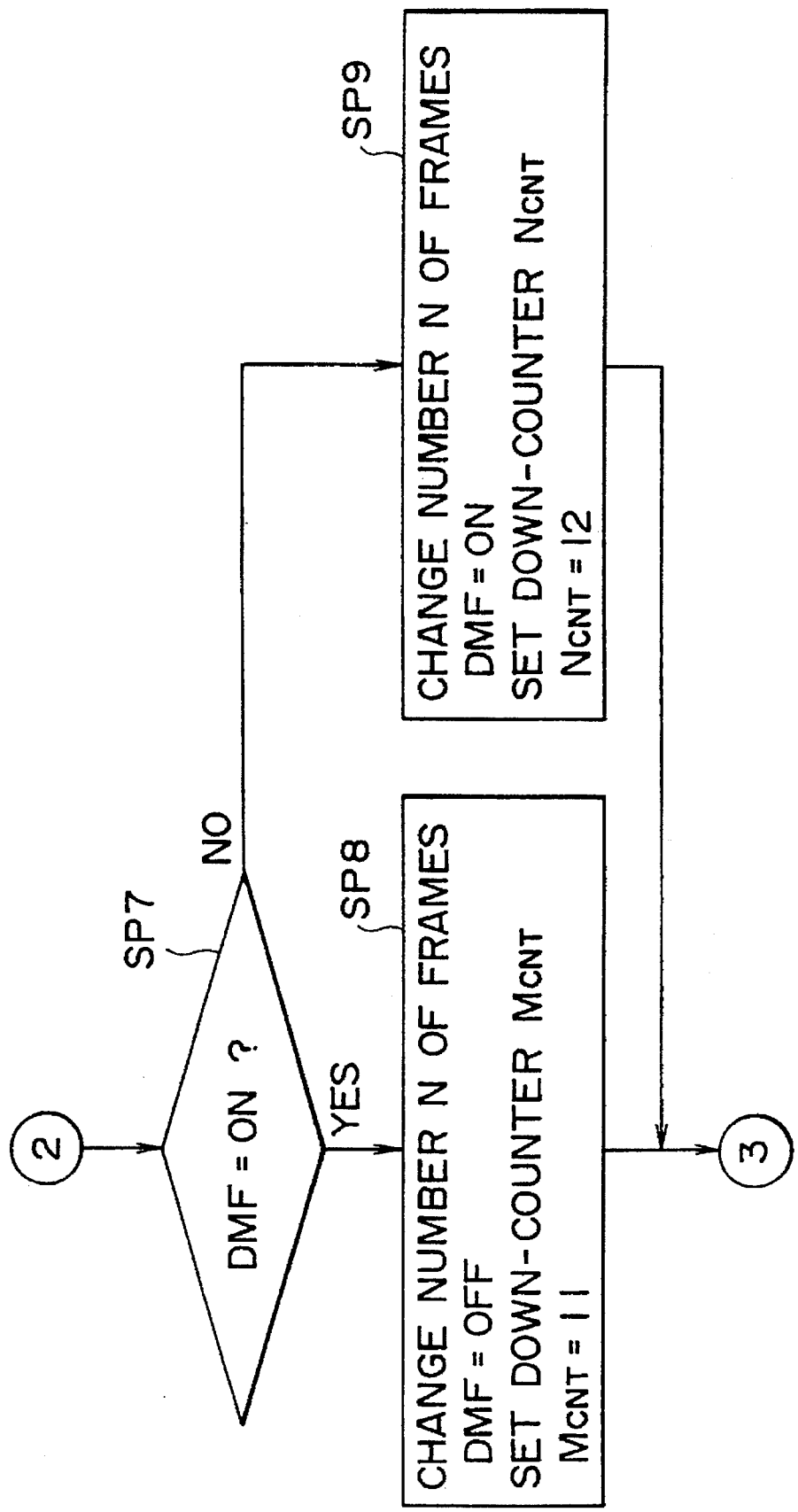
FIG. 12 is a further flow chart for explaining the procedure to set picture types in the coding apparatus of FIG. 1.

Practically, changing the picture types of the frames of GOPs that constitute one sequence of moving pictures is executed according to picture type generation procedures shown in FIGS. 10 to 12. More specifically, a picture type setting procedure is started at step SP1, and then a down-counter $N_{CNT}$ is set to N−1 at step SP2 on the basis of the frame number N preset by a program or the like with respect to the input picture data $S_1$. Similarly, a down-counter $M_{CNT}$ is set to M−1 on the basis of the appearance period M of I- or P-pictures.

When the down-counter $N_{CNT}$ is not 0 at step SP3, i.e., when the frame is not the last one in the GOP, the operation proceeds to step S10. A decision is made at step S10 as to whether the down-counter $M_{CNT}$ is 0 or not, and when the result of this decision signifies that its value is 0, the operation proceeds to step SP11. Then a decision is made at step SP11 as to whether a flag GOPs for outputting a GOPH (GOP header) is set or not, and if the result of this decision is affirmative, the operation proceeds to step SP12, where an I-picture is outputted while the flag GOPS is reset. Subsequently at step SP13, the down-counter $M_{CNT}$ for M is set to M−1. Then the down-counter $N_{CNT}$ is decremented at step SP14, and thereafter the operation returns to step SP3.

When the result of the decision at step SP10 signifies that the value in the down-counter MCNT is not 0, the operation proceeds to step SP15, where a B-picture is outputted. And subsequently at step SP16, the down-counter $M_{CNT}$ is decremented.

Meanwhile, if the result of the decision at step SP11 signifies that the flag GOPs is reset, the operation proceeds to step SP17 to output a P-picture and then proceeds to step SP13.

If the result of the decision at step SP3 signifies that the value in the down-counter $N_{CNT}$ is 0, the operation proceeds to step SP4, where a P-picture is outputted while the flag GOPs is set, and the down-counter $M_{CNT}$ is set to M. Subsequently at step SP5, a decision is made as to whether a flag SPF for changing the preset frame number is set or not. And if the result of this decision signifies that the flag SPF is reset, the operation proceeds to step SP6 to set the down-counter $N_{CNT}$ to N−1 and then returns to step SP3 again. Meanwhile, if the result of the above decision signifies that the flag SPF is set, the operation proceeds to step SP7, where a decision is made as to whether there is set or not a flag DMF of a toggle switch for changing the frame number N of one GOP to 12 or 13.

If the result of the above decision signifies that the flag DMF is set, the operation proceeds to step SP8, where the flag DMF is reset while the down-counter $M_{CNT}$ is set to 11, and then the operation returns to step SP3. In case the result signifies that the flag DMF is reset, the operation proceeds to step SP9, where the flag DMF is set while the down-counter $N_{CNT}$ is set to 12. And subsequently the operation returns to step SP3. Thereafter, until completion of one sequence of moving pictures, the above processing is executed repeatedly in respect of each frame of the picture data in accordance with the picture type setting procedure.

When the picture data $S_1$ are inputted to the coding apparatus 1 in the construction mentioned above, first the data are once stored per frame in the frame memory 5 of the frame processor 2. And the frames outputted therefrom to the rearrange circuit 7 are rearranged in response to a control signal CT, and the rearranged frames are supplied to the following-stage codec 4 in synchronism with the picture types. The picture types are outputted from the picture type generator 6 on the basis of the frame number N, the appearance period M and the flag SPF preset by the CPU 3.

The picture type generator 6 outputs picture types successively in such a manner as to form GOPs, each of which is composed of a predetermined number of frames conforming to the transmission system of the input picture data $S_1$, in accordance with the picture type generation procedure on the basis of the frame number N, the appearance period M and the flag SPF.

More specifically, when the CPU 3 has judged that the input picture data $S_1$ are those based on the 625/50 system, the CPU 3 sets the appearance period M, the frame number N and the flag SPF in the frame processor 2 in such a manner that the frame number N is changed to 12 and 13 alternately in a unit of GOP during the picture data reading mode. As a result, the frames are read out as shown in FIG. 7 and are rearranged to form GOPs. The number of the frames thus rearranged amounts to 25 in two GOPs, so that in the 625/50 system where the data transmission rate is 25 frames per second, there are formed pictures corresponding exactly to one second, whereby it is rendered possible to manage the coded picture data in a unit of second with two GOPs constituted as a minimum unit.

The decision of the CPU 3 as to whether the input picture data $S_1$ are those based on the 625/50 system or not is made in accordance with the frame frequency of the input picture data $S_1$ or with the input from the operator.

Meanwhile, in case the input picture data $S_1$ are those based on the 525/60 system, the frame number N is set to 15, and the appearance period M to, e.g., 3 respectively. As a result, the frames read out as shown in FIG. 8 are rearranged in a manner to form GOPs and then are supplied to the codec 4.

When there exists no necessity of temporal management in a unit of second in the 625/50 system, the frame number N is set fixedly to 12 as in the conventional manner, and the frames read out are rearranged as shown in FIG. 8 and then are supplied to the codec 4.

The frames of the picture data $S_2$ thus rearranged in the frame processor 2 are sent to the codec 4 in a unit of GOPs synchronously with the picture types while a header GOPH is included as a top signal in each GOP. And the coded picture data $S_{20}$ are outputted from the codec 4.

According to the construction described above, when the input picture data $S_1$ are read in, the number N of frames constituting one GOP is set in conformity with the transmission rate of the input picture data $S_1$. For example, the number N is set to 15 in the 525/60 system where the data transmission rate is 30 frames per second. Meanwhile in the 625/50 system where the data transmission rate is 25 frames per second, the number N of frames constituting one GOP is changed to 12 and 13 alternately and dynamically, whereby picture data of one second are formed exactly of two GOPs, so that it becomes possible to manage the coded picture data of GOPs in a unit of second.

Further according to the embodiment mentioned, even in nonlinear editing where picture data stored in a frame memory or the like are processed by the use of a computer, the data can be managed in a unit of second by processing the frames in a unit of GOPs.

It is to be understood that the description relative to the above embodiment is concerned merely with an exemplary case of alternately changing the number of frames in a GOP to 12 and 13 in conformity with the transmission rate of 25 frames per second of the input picture data $S_1$. However, the present invention is not limited to such an example alone, and the changeable number of frames may be set to other arbitrary values of, e.g., 11 and 14.

According to the present invention, as described hereinabove, the number of frames in GOPs each composed of a plurality of frames is adaptively changed in conformity with the transmission rate of input picture data to consequently form pictures of a predetermined unitary time in a predetermined unit of GOPs, hence realizing an improved coding apparatus and method suited to manage the coded picture data in a predetermined unitary time.

Although the present invention has been described hereinabove with reference to some preferred embodiments thereof, it is to be understood that the invention is not limited to such embodiments alone, and a variety of other modifications and variations will be apparent to those skilled in the art without departing from the spirit of the invention.

The scope of the invention, therefore, is to be determined solely by the appended claims.

What is claimed is:

1. An apparatus for coding input picture data in a unit of a plurality of frames, comprising:

a control means for setting the number of the unitary frames in conformity with the frame rate of said input picture data;

a rearrange means for rearranging, in a predetermined order, the unitary frames of the number set by said control means;

a coding means for coding the frames rearranged by said rearranged means; and wherein said control means sets the number of the unitary frames in such a manner that said number is changed alternately to 12 and 13 with regard to said picture data inputted at a rate of 25 frames per second.

2. A method of coding input picture data in a unit of a plurality of frames, comprising the steps of:

setting the number of the unitary frames in conformity with the frame rate of said input picture data;

rearranging the set number of the unitary frames in a predetermined order;

coding the rearranged frames; and wherein said number of the unitary frames is set in such a manner that said number is changed alternately to 12 and 13 with regard to said picture data inputted at a rate of 25 frames per second.

* * * * *